United States Patent [19]

Lewellin

[11] Patent Number: 4,869,433
[45] Date of Patent: Sep. 26, 1989

[54] STERILE PARTICULATE MATERIAL

[75] Inventor: Richard L. Lewellin, Frankston, Australia

[73] Assignee: Australian Cellulose Industries Pty. Ltd., Victoria, Australia

[21] Appl. No.: 110,928

[22] Filed: Oct. 21, 1987

[51] Int. Cl.$^4$ .............................................. B02C 19/12
[52] U.S. Cl. ....................................... 241/18; 241/25; 422/24
[58] Field of Search ...................... 162/4, 192, 50, 100, 162/182; 119/1; 71/14, 64.04; 422/22, 23, 24; 241/57, 60, 1, 30, 24, 79.1, 18, 25, 16; 53/167, 425

[56] References Cited

U.S. PATENT DOCUMENTS

| | | | |
|---|---|---|---|
| 2,708,418 | 5/1955 | Sugarman et al. | 162/182 X |
| 3,721,183 | 3/1973 | Dunlea | 241/25 |
| 4,072,273 | 2/1978 | Reiniger | 241/25 X |
| 4,175,140 | 11/1979 | Bachmann et al. | 53/167 X |
| 4,347,985 | 9/1982 | Simpson | 241/1 |

Primary Examiner—Mark Rosenbaum
Attorney, Agent, or Firm—Schiller, Pandiscio & Kusmer

[57] ABSTRACT

A method of producing a particulate sterile material insulation or fertilizer, includes the step of comminuting a cellulose feed material such as paper, in a hammer mill so as to produce fine particles and fibres having a large surface area to volume ratio. The particulate material is entrained in an air stream to produce separate particles of the material, and the particulate material freely falls through an ultraviolet radiation flux for a period of time sufficient to substantially completely sterilize the particulate material. The product can be used in animal breeding sheds as floor insulation. The used material with animal droppings can be similarly processed to produce a sterile particulate fertilizer ingredient.

9 Claims, 1 Drawing Sheet

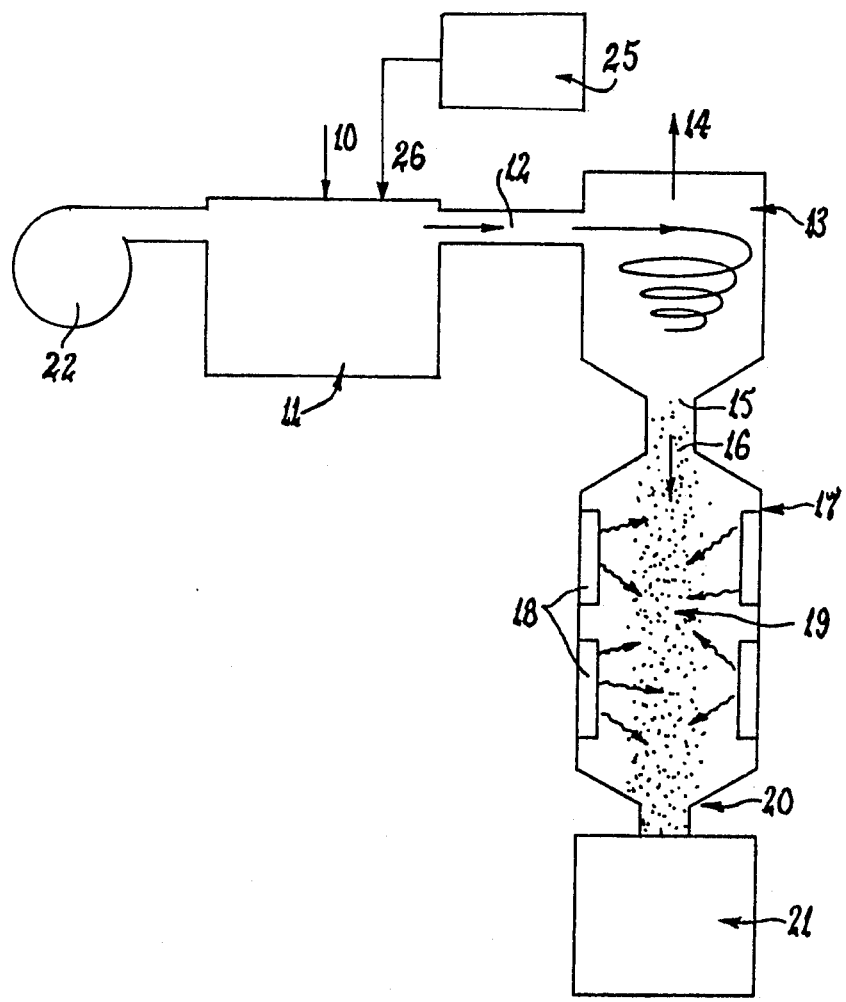

STERILE PARTICULATE MATERIAL

FIELD OF THE INVENTION

This invention relates to particulate sterile materials and to methods and apparatus for producing such materials. The invention in a first aspect relates particularly, although not exclusively, to insulation material such as for laying down over the ground or the flooring in animal sheds or the like, the insulation material being intended to be replaced with fresh material at regular intervals. In a second aspect, the invention relates particularly but not exclusively to particulate fertiliser materials.

DISCUSSION OF PRIOR ART

In intensive chicken breeding and raising, the sheds used usually have an earth, tar or concrete floor and insulation material is laid on the floor to a depth of several centimetres. This is particularly necessary for young chicks so that body heat is not lost to the ground or flooring. Presently this insulation material can be either in the form of wood shavings and chips or shredded paper. In the case of the use of wood shavings or chips, the introduction of such material to the sheds can result in the introduction of bacterial and other infections carried by the insulation material. This can lead to very high mortality rates in the chicks as the infection spreads throughout the chicks. The use of shredded paper such as shredded newsprint can also lead to the introduction of infectious organisms and can also lead to the chicks being choked or strangled since many will burrow in the shredded paper insulation layer.

U.S. Pat. No. 2,708,418 in the name of Sugarman describes a bedding material suitable for use in poultry breeding structures. The material is made from waste paper which is pulped with the addition of a disinfectant, germicide, fungicide or other agent. The pulp is formed into sheets which are dried and then chopped into fragments of substantial volume, e.g. in the order of one cubic centimetre. This material would not be a very effective insulator because of the very coarse nature of the fragments so that considerable heat would be lost to the ground or flooring through the relatively large air spaces between the fragments. Also the material would be relatively expensive and/or inconvenient to produce because of the number of steps involved in the production. The used material having animal droppings or excrement mixed with the material would need to be handled with considerable care in order to be useful as fertiliser because of the risk of pathogenic organisms being introduced and carried by the excrement and by the used material.

U.S. Pat. No. 3,828,731 in the name of White describes a litter or bedding material for animals, comprising cellulose material in sheet form which is treated with microbial inhibitors carried by a solvent. The sheet is chipped or shaved to form pieces having a volume in the order of 1 cubic centimetre. Very fine particles are removed before use. The principal disadvantages of the material described in White are the same as the Sugarman material.

OBJECTS OF THE INVENTION

It is an object of the present invention to provide a particulate sterile material which is relatively simple to manufacture and which can have very low live organism counts.

It is an object in a first preferred aspect to produce a particulate sterile insulation material suitable for use in animal enclosures and which is relatively simple to produce, is an effective insulator and can have very low organism counts.

It is an object of second preferred aspect of the invention to provide a particulate sterile fertiliser material which is relatively simple to produce and which can have very low live organism counts reducing the need for extreme care in processing, handling and use.

SUMMARY OF THE INVENTION

According to the present invention there is provided a method of producing a particulate sterile material, including the steps of: comminuting a feed material so as to produce a particulate material including fine particles having a large surface area to volume ratio, rendering the particulate material in a low density form comprising substantially separate particles of the material, and exposing the particulate material in the low density form to a radiation flux for a period of time sufficient to substantially completely sterilise the particulate material.

Preferably the step of comminuting the feed material comprises pulverising the feed material so as to produce the fine particles, and the step of rendering the particulate material in a low density form comprises entraining in air the fine particles resulting from the pulverising step so as to create an aerated suspension of the fine particles. The method may further include the step of deaerating the suspension of fine particles and then allowing the substantially separate particles to fall under quiescent conditions, the falling separate particles being exposed to the radiation flux.

The radiation flux may comprise ultraviolet radiation of germicidal wavelengths, the intensity of the radiation flux and the step of exposing the material being carried out for an exposure time sufficient to kill substantially all micro-organisms at the surfaces of the fine particles. The time for which the material is exposed to the ultraviolet radiation flux may be in excess of three seconds. The substantially separate fine particles of the material may be allowed to fall freely through the radiation flux whereby substantially the entire surface area of each particles is exposed to the ultraviolet radiation for a period of time sufficient to kill micro-organisms.

Preferably the feed material includes paper so that the step of comminuting the feed material results in the production of cellulose fibres from the paper, the fibres having an average length of less than 5 mm.

According to a first particular aspect of the invention there is provided a method of producing a particulate sterile insulation material, including the steps of comminuting by repeatedly hammering a feed material which includes paper so as to produce fibre matter comprising individual fibres and small clusters of fibres of cellulose material from the paper, the fibre matter having a large surface area to volume ratio, rendering the fibre matter in a low density substantially separate form, exposing the fibre matter in the low density form to a radiation flux for a period of time sufficient to substantially completely sterilise the fibre matter, and collecting the sterilised fibre matter as insulation material substantially free of infectious organisms.

According to a second particular aspect of the invention there is provided a method of producing a particulate sterile fertiliser material, including the steps of: comminuting a feed material comprising cellulose material and animal droppings so as to produce fibre matter comprising individual fibres and small clusters of fibres of cellulose material and fine particles of animal droppings matter, the fibre matter and particles having a large surface area to volume ratio, rendering the fibre matter and particles in a low density substantially separate form, exposing the fibre matter and particles in the low density form to a radiation flux for a period of time sufficient to substantially completely sterilise the fibre matter and particles, and collecting the sterilised fibre matter and particles for use as or in a fertiliser.

In this second aspect of the feed material is preferably dried before the step of rendering the fibre matter and particles in a low density form so as to reduce the moisture content of the feed material and eliminate or substantially reduce the tendency of the feed material to agglomerate before the step of exposing the material to the radiation flux. If desired the drying may be carried out before the comminuting step.

BRIEF INTRODUCTION TO THE DRAWINGS

Possible and preferred features of the present invention will now be described with particular reference to the accompanying drawing. However it is to be understood that the features illustrated in and described with reference to the drawing are not be construed as limiting on the scope of the invention.

In the drawing there is shown schematically an apparatus for producing particulate sterile material according to an embodiment of the present invention.

DETAILED DESCRIPTION OF THE DRAWINGS

It will generally be convenient to describe the apparatus for producing the particulate material according to the invention and from this description the nature of the material itself together with the method of producing the material will be apparent. Also generally the description will refer to insulation production although it is to be understood that fertiliser or materials for other purposes may be produced.

The apparatus illustrated includes a hammer mill 11 to which cellulose containing material is fed at 10.

The cellulose material used in the present invention may be any suitable substance although it is expected that for the envisaged application of animal shed flooring insulation, paper such as newsprint will be suitable material. Other cellulose materials may be included such as rice husks. Paper used may be recycled paper so that initially the paper will be expected to be carrying infectious organisms such as bacteria e.g. as a result of prior human handling. The cellulose material in an alternative use of the invention as fertiliser comprises cellulose material and animal droppings collected from the floors of animal sheds.

The step of comminuting the paper in the hammer mill 11 is effective to produce cellulose fibres preferably of an average length less that 10 mm and most preferably of an average length less the 5 mm.

The hammer mill 11 which when fed with paper such as newsprint will pulverise the paper to produce fine particles and particularly fibres and fibre clusters. The resulting fine particles are entrained in air so as to create an aerated suspension 12 of fine particles and this suspension can convey the particles away from the mill 11 continuously. For this purpose an air flow can be created by fan 22.

The fine particles are carried as a suspension 12 to cyclone deaerator 13. The majority of the air is withdrawn from the deaerator 13 through the top as shown by reference numeral 14 while the particles and fibres are allowed to fall gently through the bottom outlet 15. These particles fall through the inlet 16 of the sterilising column 17. The column 17 is an upright tube of say one square meter area and about four meters high. In the column 17 there are arranged a plurality of UV sources 18 such as UV fluorescent tubes such that in the region 19 through which the particles and fibres fall there is a sterilising flux of UV radiation of germicidal wavelength(s).

The UV radiation frequency and intensity can be chosen so as to kill organisms at the surfaces of the falling particles. For this effect the sterilising step is carried out after the comminuting step since the comminuting step will produce particles of large relative surface area to volume ratio. The radiation flux preferably has a wavelength and intensity such that for the radiation exposure time and the particle size of the comminuted cellulose material there is substantially complete killing of micro-organisms at the surface of the cellulose material.

The time for which the cellulose material is exposed to the radiation flux in column 17 is preferably in excess of three seconds and is preferably in the range of four to six seconds. The particles pass through the bottom outlet 20 to zone 21 where collection and packaging for example takes place.

The output of the apparatus collected at 21 will be a sterile dry particulate cellulose material. If desired a powder or particulate sterilising agent can be added to the cellulose material at this stage, for example for the purpose of actively sterilising animal droppings that in use will accumulate on or in the material when used as animal shed floor insulation.

Also a fire retardant, such as the water soluble compound sold under the trade mark FLOVAN can be added to the material for insulation uses. The feed material can be sprayed or soaked with a solution or a suspension of fire retardant and then dried prior to pulverising.

The cellulose material can be bagged for transport and use. Alternatively the particulate cellulose material can be compressed, e.g. hydraulically, into bricks or the like for ease of handling and transport. The bricks may be coated with a plastics material to maintain the material sterile by providing a barrier to airborne organisms or organisms introduced in other ways. The bricks can be returned to fine particulate form at the site of use, e.b. by feeding the bricks to rotating studded cylinders arranged to break up the bricks into fine particulate form.

In the case of use of the insulation material in animal shed flooring, the particulate material can be blown into the shed and allowed to settle to form a uniform depth layer on the floor. If desired the material can be gently rolled to compress the material and reduce the incidence or airborne material. The rolling of the material however is not believed to be essential since it has been found that pulverised paper does not congest the lungs of young chicks.

After the material has been in use for some weeks as floor insulation the material should be replaced with fresh insulation material. The insulation material and animal droppings can be removed by a vacuuming process. Again the used material can be hydraulically pressed into bricks for ease of transport and handling. The used material can be used as or provide the basis for manufacture of a fertiliser since the animal droppings and cellulose material will both provide nutrients for plant growth. In particular, the mixed cellulose material and animal droppings can be dried as illustrated in drier 25 and then fed at 26 to the hammer mill 11 for comminution and later sterilisation according to the invention.

EXAMPLE

In one example of a method of producing insulation material according to the present invention, paper was pulverised to form individual cellulose fibres and clusters of fibres of an average length less that 5 mm. These fibres had an average plate count at 30° C. of 170 organisms per gram. This count represented a wide variety of different bacterial types. After exposure of this sample to ultraviolet radiation by passing the material through a column, the plate count, after 48 hours incubation at 30° C. was two organisms per gram of material. This shows that the method and apparatus is capable of producing substantially sterile fine particulate insulation suitable for use in animal shed floors.

It will be seen that the material produced according to the preferred embodiment of the present invention can be produced with a very low live organism count. This means that for chicken sheds or the like, there is low probability that the insulation material will be a significant source of introduction of infectious organisms into the animal shed. Also the fertiliser produced according to the invention can be handled processed and used with less risk of transmission of pathogenic organisms that might have initially been present in the material collected from the animal shed floor.

I claim:

1. A method of producing a particulate sterile material, including the steps of:
   comminuting a cellulose feed material so as to produce a particulate material preponderantly formed as individual fibres and small clusters of fibres of cellulose material having a large surface area to volume ratio,
   rendering the particulate material in a low density form comprising substantially separate particles of the material in a relatively large volume of fluid,
   and exposing the particulate material in said low density form to a radiation flux from a plurality of directions so that substantially all surfaces of substantially all particles are exposed to the flux and for a period of time sufficient to substantially completely sterilise the particulate material.

2. A method as claimed in claim 1 wherein the step of comminuting the feed material comprises pulverising the feed material so as to produce the fine particles, said step of rendering the particulate material in a low density form comprising entraining in air the fine particles resulting from the pulverising step so as to create an aerated suspension of the fine particles.

3. A method as claimed in claim 2 and further including the step of deaerating the suspension of fine particles and then allowing the substantially separate particles to fall under quiescent conditions, the falling separate particles being exposed to the radiation flux.

4. A method as claimed in claim 1 wherein the radiation flux comprises ultraviolet radiation of germicidal wavelengths, the intensity of the radiation flux and the step of exposing the material being carried out for an exposure time sufficient to kill substantially all microorganisms at the surfaces of the fine particles.

5. A method as claimed in claim 4 wherein the time for which the material is exposed to the ultraviolet radiation flux is in excess of three seconds.

6. A method as claimed in claim 1 wherein the feed material includes paper, the step of comminuting the feed material resulting in the production of cellulose fibres from the paper, the fibres having an average length of less than 5 mm.

7. A method of producing a particulate sterile insulation material, including the steps of:
   comminuting by repeatedly hammering a feed material which includes paper so as to produce fibre matter preponderantly formed as individual fibres and small clusters of fibers of cellulose material from the paper, the fibre matter having a large surface area to volume ratio,
   rendering the fibre matter in a low density substantially separate form comprising substantially separate particles of the material in a relatively large volume of fluid,
   exposing the fibre matter in said low density form to a radiation flux from a plurality of directions so that substantially all surfaces of substantially all particles are exposed to the flux and for a period of time sufficient to substantially completely sterilise the fibre matter, and
   collecting the sterilised fibre matter for laying down over the ground or flooring in animal sheds or in other environments where insulation material may be a source of infectious organisms.

8. A method of producing a particulate sterile fertiliser material, including the steps of:
   comminuting a feed material comprising cellulose material and animal droppings so as to produce fibre matter preponderantly formed as individual fibres and small clusters of fibres of cellulose material and fine particles of animal droppings matter, the fibre matter and particles having a large surface area to volume ratio,
   rendering the fibre matter and particles in a low density substantially separate form comprising substantially separate particles of the material in a relatively large volume of fluid,
   exposing the fibre matter and particles in said low density form to a radiation flux from a plurality of directions so that substantially all surfaces of substantially all particles are exposed to the flux and for a period of time sufficient to substantially completely sterilise the fibre matter and particles,
   and collecting the sterilised fibre matter and particles for use as or in a fertiliser.

9. A method as claimed in claim 8 wherein the feed material is dried before the step of rendering the fibre matter and particles in a low density form so as to reduce the moisture content of the feed material and eliminate or substantially reduce the tendency of the feed material to agglomerate before the step of exposing the fibre matter and particles to the radiation flux.

* * * * *